April 28, 1925.

J. STRATINSKY

BUMPER

Filed July 18, 1924

1,535,746

INVENTOR.

Joseph Stratinsky

Patented Apr. 28, 1925.

1,535,746

UNITED STATES PATENT OFFICE.

JOSEPH STRATINSKY, OF CHICAGO, ILLINOIS.

BUMPER.

Application filed July 18, 1924. Serial No. 726,809.

*To all whom it may concern:*

Be it known that I, JOSEPH STRATINSKY, citizen of the United States, residing in Chicago, in the county of Cook and State of Illinois, have invented certain new and useful Improvements in Bumpers of the following description, reference being had to the accompanying drawings.

This invention relates to the class of bumpers, which are adapted to be secured to vehicles like automobiles, trucks, tractors etc.

Figure 1:
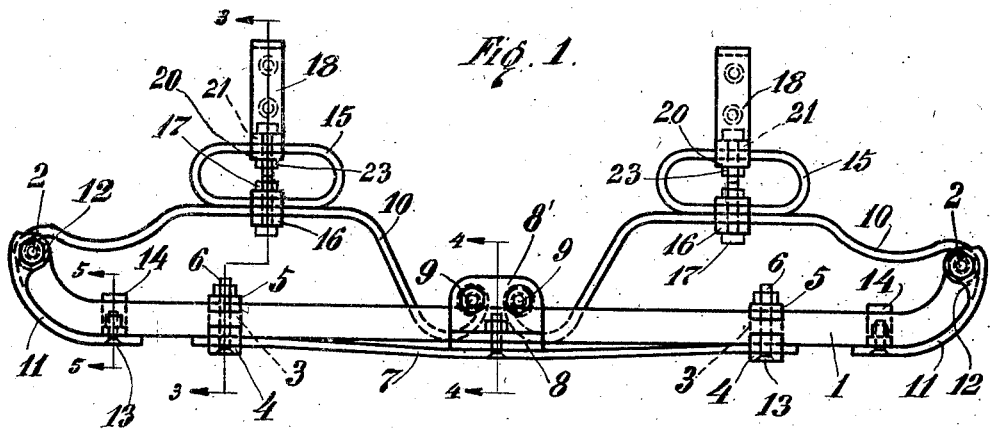

Figure 1. of the accompanying drawing shows a top view of the bumper, which for convenience of the description is adapted to be fastened to the front end of an automobile frame.

Figure 2:
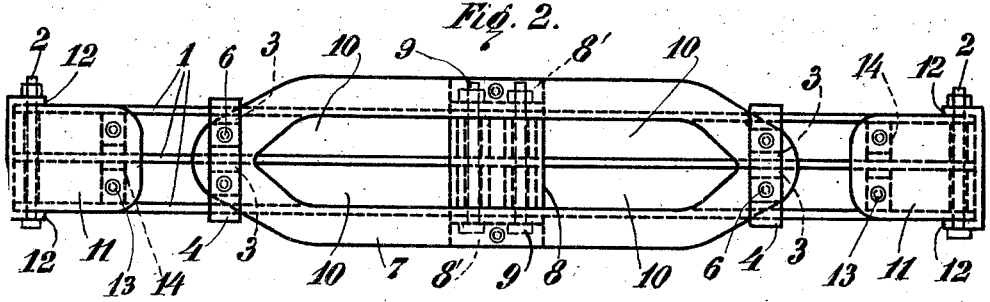

Figure 2. is a front view of the bumper.

Figure 3:
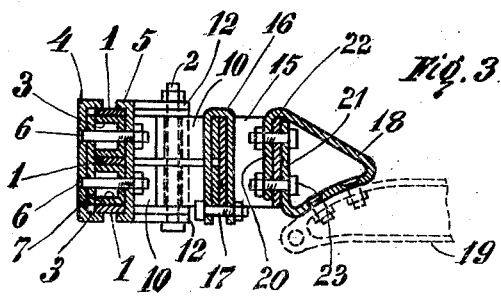
Figure 4:
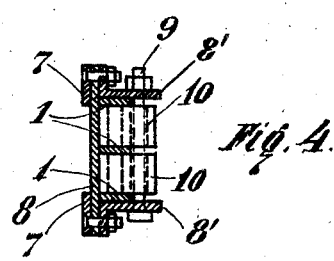
Figure 5:
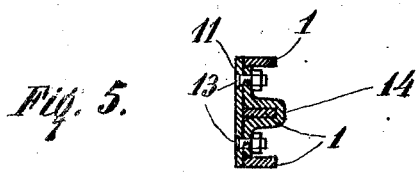

Figures 3, 4 and 5 are cross sections through respective lines 3—3, 4—4, and 5—5 of Figure 1.

In constructing a bumper in accordance with my invention, I provide a plurality of flat bars 1, which are turned edgewise to the front and at their ends, are suitably bent into preferably arc form. These ends have holes for the reception of bolts 2, to which other members are partly pivotally and partly rigidly fastened.

This kind of arrangement of the bars 1, has the advantage over the bumpers where the flat sides of the bumper bars are facing the front, that they are more rigid, in case of an impact which will not be deformed, or broken, and will transfer more uniformly the shock with both of their ends to the spring members of the bumper.

In order to space the bars 1, in suitable distances from each other, I provide preferably U shaped distance pieces 3, as shown in Figure 3, and which distance pieces are rigidly fastened to clamps 4 and 5, by means of rivets or as shown in the drawing by means of bolts 6. To offer a bigger bumping surface, a bumping member 7 is held in position at the front edges of the bars 1, by means of clamps 4 and bolts 6. Said bumping member 7 supports at its upper and lower center, plate 8 and brackets 8', which brackets are also slidably supported on the flat surfaces of the uppermost and lowest flat bars 1. These brackets 8', have also holes for the reception of bolts 9, to which are pivotally engaged springs 10. These springs 10 are at their other ends pivotally engaged between the flat bars 1, by means of bolts 2. These springs 10, act also as separators for the flat bars 1, because their edges fit between the flat surfaces of bars 1.

This bumper carries also at its two ends guards 11, which cover the entire width of the bumper, and which are formed in conformity with the bends or arcs of the bars 1, and which guards have ears 12, which bend over the uppermost and lowest bars 1, and through which bolt 2 fastens these guards 11 to the bumper. Guard 11 is also fastened to the bumper by means of preferably bolts 13 and bracket 14, which brackets butt against the inner flat surfaces of the uppermost and lowest bars 1, thus serving as distance pieces and surround the middle bar, thus holding it rigidly in position. The purpose of these guards 11, is partly to offer a bigger bumping surface in case the vehicle should strike an object with the end of the bumper, and partly to lessen the injury, which would eventually occur, if bars 1, would strike with their bare edges.

Springs 10, carry the oblong shaped springs 15, which are held in place to the bumper by the U shaped bracket 16, and bolt 17.

In order to fasten this bumper to a vehicle, I provide a triangular shaped bracket 18, suitably fastened, in this case for the sake of explanation to the front part of an automobile frame 19. The outer end 20, bends over the inner end 21, of the bracket 18, in such a way, that it forms a space or recess 22, which has a width equal to the thickness of spring 15. Spring 15, is pushed in this space 22, and securely held there by means of bolts 23.

I claim:

1. A bumper comprising a plurality of flat bars, spaced between their flat surfaces and turned edgewise to the front, bent rearwardly at their ends, having these ends suitably covered with flat guards and in combination with it a plurality of flat rear springs pivotally mounted at the ends, and near the centre of the flat bars; having also suitably supported on the rear springs oblong shaped spring rings rigidly fastened between the overlapping ends of a bracket, which in turn is rigidly fastened to the frame of a vehicle.

2. A bumper comprising three flat bars, spaced between their flat surfaces and turned edgewise to the front, bent rearwardly at their ends, having these ends suitably covered with flat guards and in combination with it a plurality of flat rear springs pivotally mounted at the ends, and near the centre of the flat bars; having also suitably supported on the rear springs oblong shaped spring rings rigidly fastened between the overlapping ends of a bracket, which in turn is rigidly fastened to the frame of a vehicle.

3. A bumper comprising three flat bars, spaced between their flat surfaces and turned edgewise to the front, bent rearwardly at their ends, having these ends suitably covered with flat guards and in combination with it two pairs of flat rear springs pivotally mounted at the ends and near the centre of the flat bars; having also suitably supported on the rear springs oblong shaped spring rings rigidly fastened between the overlapping ends of a bracket, which in turn is rigidly fastened to the frame of a vehicle.

4. A bumper comprising three flat bars, spaced between their flat surfaces and turned edgewise to the front, bent rearwardly at their ends, having these ends suitably covered with flat guards, and in combination with it two pairs of flat rear springs pivotally mounted at the ends and near the centre of the flat bars; having also suitably supported on the rear springs two oblong shaped spring rings rigidly fastened between the overlapping ends of a bracket, which in turn is rigidly fastened to the frame of a vehicle.

Signed at Chicago, in the county of Cook and State of Illinois, this 21st day of June, 1924.

JOSEPH STRATINSKY.